United States Patent [19]
Filipovich et al.

[11] 3,744,884
[45] July 10, 1973

[54] LENS MOUNT ASSEMBLY FOR FOCUSABLE, VARIABLE FOCAL LENGTH LENS

[75] Inventors: Danny Filipovich, Chicago, Ill.; Richard K. Carlson, Tokyo, Japan; Theodore M. Hadzimahalis, Libertyville, Ill.

[73] Assignee: Bell & Howell Company, Chicago, Ill.

[22] Filed: Nov. 2, 1971

[21] Appl. No.: 194,984

[52] U.S. Cl. .............................. 350/255, 350/178
[51] Int. Cl. ........................................... G02b 7/02
[58] Field of Search ............... 350/245–257, 178

[56] References Cited
UNITED STATES PATENTS

| | | | |
|---|---|---|---|
| 3,437,404 | 4/1969 | Seedhouse | 350/255 |
| 775,934 | 11/1904 | Patterson | 350/257 |
| 2,908,209 | 10/1959 | Marvin et al. | 350/255 |
| 3,220,308 | 11/1965 | Lareau | 350/255 |
| 3,410,630 | 11/1968 | Jacobs | 350/187 |
| 3,140,339 | 7/1964 | Nisperly et al. | 350/301 |

Primary Examiner—David Schonberg
Assistant Examiner—Michael J. Tokar
Attorney—John E. Peele, Jr.

[57] ABSTRACT

A lens mount assembly for the variable magnification afocal or zoom unit of an objective lens for a camera including first and second barrel portions cooperating to define cam tracks by which optical components are simultaneously and differentially adjusted axially upon rotational adjustment of an external sleeve which further carries a focusing element adjusted by axial movement of the sleeve. Further, a method of fabrication of the lens mount assembly is described.

7 Claims, 7 Drawing Figures

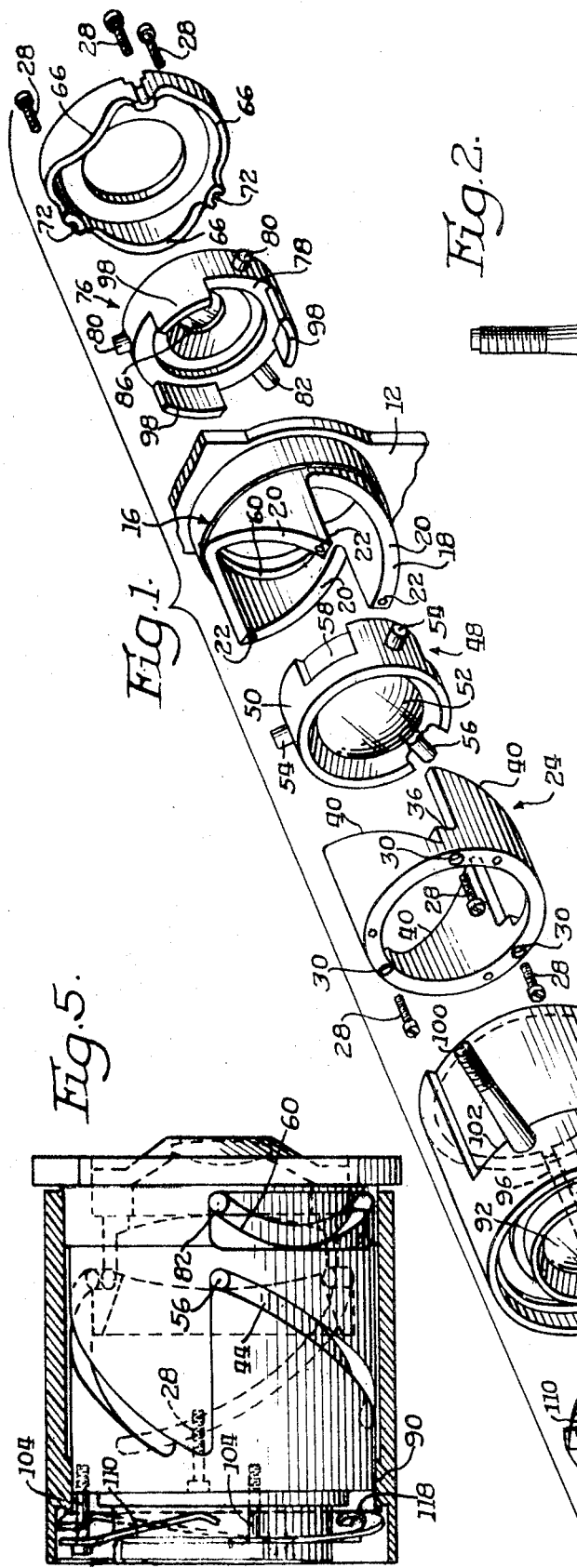

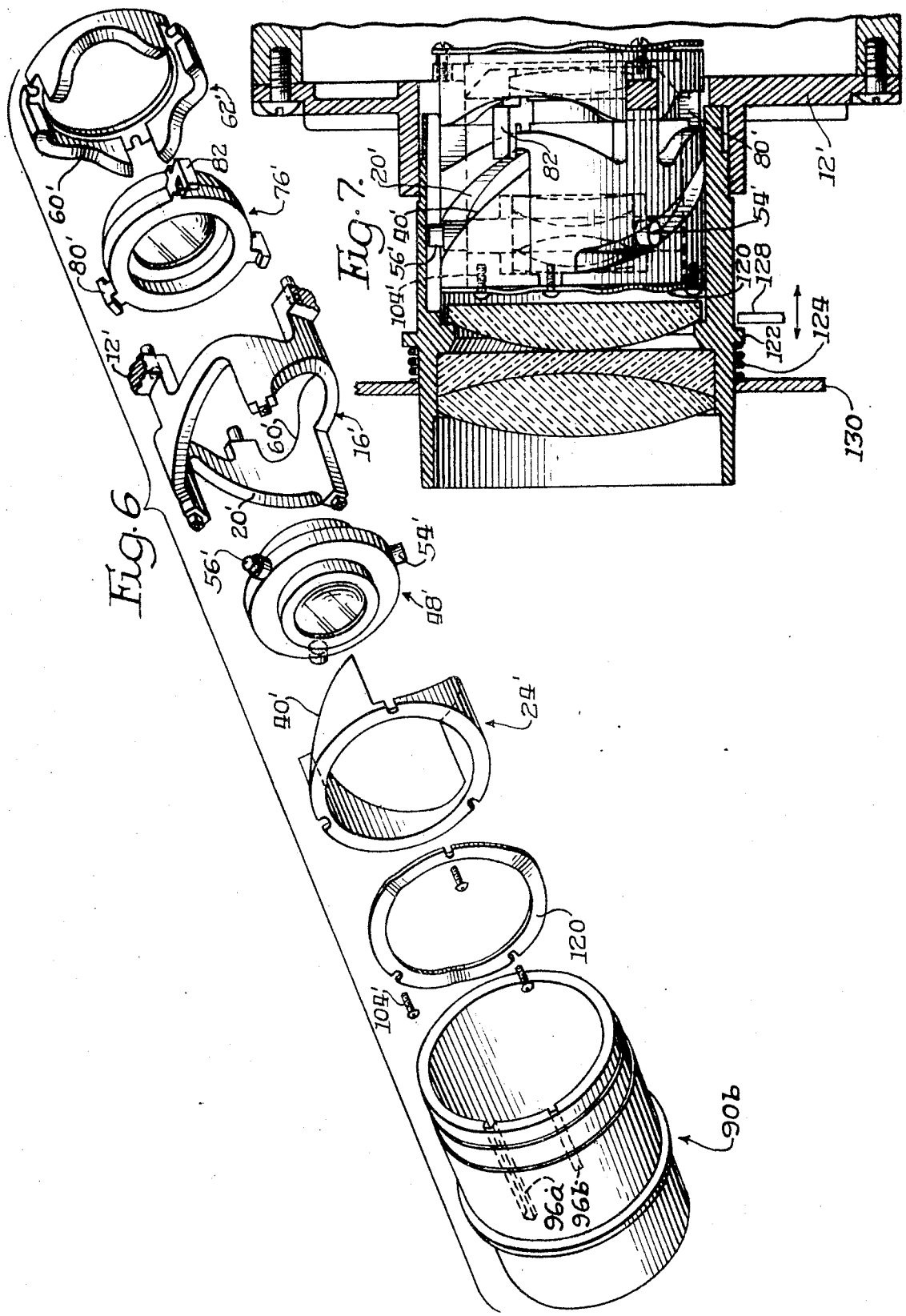

LENS MOUNT ASSEMBLY FOR FOCUSABLE, VARIABLE FOCAL LENGTH LENS

This invention relates to photographic cameras, especially motion picture cameras, and more particularly to a relatively simple, inexpensive mount assembly for adjustably supporting components of a variable magnification afocal or zoom unit for an objective lens of the camera with simultaneous differential movement of the lens components along the optical axis of the camera.

Lens mounts for most cameras available today are formed with barrel and sleeve members machined from metal. These members are assembled with the relatively high precision required for maintaining accurate orientation and spacing between the several optical elements of the lens. That is, the mount assembly is designed for differentially adjusting at least a pair of lens elements axially relative to a film plane of the camera while maintaining their perpendicular relationship to the optical axis of the camera. The previously known mounts have not been completely satisfactory primarily because of the cost of fabrication and assembly of the metallic members within the required tolerances.

A lens mount assembly according to the present invention supports two lens element carriers arranged for simultaneous differential movement along the optical axis defined by the elements in the carriers and other optical elements. Adjustment of the optical elements is caused by rotation of an external sleeve which cooperates with cam followers on the lens carriers, which followers ride on cam surfaces defined by internal barrel portions. Upon assembly of the barrel portions, the cam surfaces cooperate to define cam tracks causing precise relative adjustment of the lens carriers. Together with the resulting barrel, the sleeve and lens carriers are formed of dimensionally stable synthetic material.

The method of fabricating a lens mount assembly according to the present invention includes the steps of forming cooperating cylindrical barrel portions, each of which supports an axially effective cam surface. Lens cells having cam followers and a drive member are assembled between selected of the cam surfaces of the barrel portions as a sub-assembly. A sleeve member, preferably including a focusing lens cell, is assembled over the resulting sub-assembly with a driver cooperating with the drive members on the lens cells for adjusting the cells as required.

Therefore, an object of the present invention is to provide an easily assembled lens mount assembly enabling accurate adjustment of differentially movable lens cells.

Another object is to provide a method of assembly of components of the lens mount assembly.

Yet another object is to provide a lens mount assembly formed primarily of dimensionally stable synthetic material.

The above and other objects will be apparent from the description of the accompanying drawings in which like numerals refer to like parts.

In the drawings:

FIG. 1 is an exploded perspective view of a preferred embodiment of a variable magnification afocal or zoom section of an objective lens assembly according to the invention;

FIG. 2 is an elevational view of the assembled lens mount assembly;

FIG. 3 is a cross-sectional view of the assembly taken along section line 3—3 of FIG. 2;

FIG. 4 is a cross-sectional view of the assembly taken along section line 4—4 of FIG. 3;

FIG. 5 is a cross-sectional view taken along the section line 5—5 of FIG. 3;

FIG. 6 is an exploded perspective view of a second embodiment according to the invention; and FIG. 7 is an elevational view of the assembled lens mount assembly according to the second embodiment of the invention.

Referring to the drawings, a lens mount assembly 10 is shown attached to a face plate member 12 of a camera, not other-wise shown. In this preferred embodiment, a first barrel portion 16 is integral with and extends axially from the face plate member 12. On the remote end edge 18 of that barrel portion are formed several cam surface portions 20, shown as three, and therebetween a corresponding number of abutments 22. Relative to the abutments on this first barrel portion, a second barrel portion 24 is substantially aligned and fixedly positioned by attaching members 28, shown as self tapping screws. The screws pass through locating holes 30 in the second barrel portion into receiving seats 34 in the abutments of the first barrel portion. A plurality of spacer members 36 are arranged on the adjacent edge of the second barrel portion to cooperate with the abutments 22. On the remainder of the edge of the second barrel portions are formed cam surface portions 40 which cooperate with the cam surface portions 20 of the first barrel portion. The cam surface portions prescribe an axially effective cam track 44 in which a lens element carrier or lens cell 48 is adjustably supported.

The lens cell includes a carrier body 50 formed as a cylinder which rigidly mounts an optical element 52. From the periphery of the carrier body, several cam follower studs 54, including a cell drive stud 56, are fixed to extend radially. The carrier body 50 is formed with a cylindrical aligning surface dimensioned in diameter slightly less than the internal diameter of the barrel formed by the barrel portions. Further, the carrier body has a length sufficient to prevent tilting and misalignment of the cell in the barrel portions 16, 24 while permitting rotational and axial sliding movement of the cell. To enable limited telescopic movement with another cell, a number of longitudinal recesses 58 are spaced about the external periphery of the cylindrical carrier body.

The first barrel portion 16 further includes several axially effective second cam surface portions 60, aligned with and equal in number with the first cam surface portions 20. Attached to the rear surface of the first barrel portion is a third barrel portion or cap member 62 having edge cam surface portions 66 cooperating with the cam surface portions 60 of the first barrel portion 16 to define a cam track 68. A plurality of attaching web portions 72 of the cap member 62 are provided between the cam surface portions to enable attachment of the cap member to the first barrel portion. A lens cell 76 is formed with a cylindrical carrier body portion 78 from which cam followers shown as studs 80, including a cell guide stud 82, extend radially. The cam followers 80, 82 ride in the cam track 68 formed between the first and third barrel portions to cause axial adjustment of an optical element 86 supported in the carrier.

Optical components or lens cells 48 and 76 are adjustable simultaneously and differentially by a sleeve 90 which also supports a focusing lens component 92. The lens cell guides 56, 82, fixed to the respective lens cell carriers, extend radially from the carrier bodies further than the remaining cam followers so as to ride in a groove 96 formed internally of and extending longitudinally within the sleeve 90. Similarly, the extended cam follower or cell drive stud 82 on the lens cell 76 engages in the groove 96 in the sleeve 90. Hence, upon rotation of the sleeve, groove 96 acts as a cell driver causes axial movement of both of the optical components 48, 76 as the respective cam follower studs are moved along the cam tracks 44, 68.

As is apparent from the drawings, the focal length adjusting or variator optical component 48 moves substantially linearly along cam track 44 upon rotation of the sleeve 90, whereas the compensator lens optical component 46 is moved reversibly by the cam track 68. Further, this second lens cell is provided with tab or wing portions 98 which extend longitudinally from the carrier body adding to its stability during sliding movement within the barrel. The tab portions 98 telescope into the recesses 58 in the first lens cell enabling relatively close spacing of the lens cells at certain relative positions of these cells.

The sleeve 90 includes a control handle 100 enabling manual actuation of the sleeve by the user of the camera. Formed integrally with the sleeve is a focusing rim portion 102 by which the sleeve and the lens cell carried thereby can be adjusted axially by a not shown focusing mechanism of the camera. Such a focusing mechanism may be of any of several categories providing for manual, semi-automatic, or automatic focus determination.

The sleeve 90 is internally dimensioned to snugly enclose the lens barrel formed of barrel portions 16, 24 in slidable engagement. By attaching members 104 shown as self-tapping screws, and a circular retaining spring 110, the sleeve is adjustably attached to the forward or second lens barrel portion 24. The screws are passed through portions of the spring and through locating holes 112 in the sleeve, and into the second barrel portion. The retaining spring has several finger sections 116 which extend from the primary body portion thereof and engage web or rail sections 118 of the sleeve 90. The web sections are formed between the periphery of the lens cell and the internal cylindrical wall of the sleeve. Thus, the spring, held by the attaching members to the second barrel portion, biases the sleeve rearwardly of the camera yet permits yieldable forward positioning of the sleeve responsible to the focus determination mechanism.

The several described components provide a lens mount assembly for the afocal section of a focusable variable focal length objective lens. Preferably, the components are fabricated as a sub-assembly including the face plate of the camera. After assembly to the camera frame, the circular retaining spring maintains the sleeve urged in cooperative relationship with the focus determination mechanism of the camera. By this mechanism, the objective lens is caused to be focused by axial adjustment of the sleeve. An externally accessible handle portion on the sleeve enables varying the focal length of the objective lens as the user rotatably manipulates the sleeve to adjust the variator and the compensator cells of the lens. By the groove inside the sleeve, the lens cells are caused to ride along the respective cam tracks whereby the cells are axially adjusted as required. Since the cam surfaces of the barrel portions are fixed relative one another, the spacings of the cam tracks formed thereby are fixed sufficiently to enable the cam followers on the lens cells to move freely yet to prevent undesired tilting of the lens cells within the resulting lens barrel.

To enable the preferred embodiment of this assembly to be fabricated in a simple, economical manner, the primary components are molded of a dimensionally stable synthetic material such as glass-filled polycarbonate, a plastic-like material sold by General Electric Company under their trade name NORYL or glass-filled acrylonitrile-butadiene-styrene, a plastic-like material sold by Liquid Nitrogen Processing Corp. under their trade name ABS. Since selected surfaces of the components cooperate with only selected surfaces of other components, critical spacings and relative positions are properly and permanently established. Therefore, adjustments by rotation and/or axial manipulation of the sleeve alter only predetermined inter-optical relationships.

In another embodiment of a lens mount assembly as shown in FIGS. 6 and 7; structural components similar to the components of the preferred embodiment are described. The camera is provided with a face plate 12' to which a first barrel portion 16' is attached. A plurality of cam surfaces 20', 60' are formed on the forward and rearward edges of the barrel portion. A second barrel portion 24' is formed with cam surfaces 40' and arranged to be aligned with the first barrel portion to define a cam track 44' with cam surface 20'. A second cam track 68' is formed by cooperation of cam surfaces 66' on a third barrel portion or cap 62' with the cam surfaces 60' of the first barrel portion. During the steps of assembly of the barrel portions, lens cells 48', 76' are located in the cam tracks so as to be axially adjustable. The fabrication steps for this sub-assembly include bringing the barrel portions together, with the second and third barrel portions biased toward the first barrel portion by wave springs 120 attached to the first barrel portion. The lens cells 48', 76' are provided with cam followers 54', 80' and cell drive members 56', 82' which cooperate with cell driver grooves 96a, 96b formed in a sleeve 90' telescopically assembled over the sub-assembly.

This latter embodiment distinguishes over the preferred embodiment by variations in selected components and the fabrication of the several components into an operative assembly. Particularly the wave springs 120 (only one shown in FIG. 6) are fixed to the first barrel portion 16' by heat staking, cementing, or attaching members shown as self tapping screws 104'. Thus, the wave spring biases the outer barrel portions toward the first or inner barrel portions under constant pressure such that the outer barrel portions urge the cam followers against the cam surfaces of the first barrel portions. Although the cam surfaces of the second barrel portion are preferably accurate, they may have greater tolerances, since the axial positioning of the lens cells is responsive solely to the cam surfaces of the inner barrel portion against which the followers are urged.

To maintain the sleeve 90' over the sub-assembly, a portion of the camera face plate 12' is arranged to enclose a rim 122 formed about the sleeve. A resilient member, shown as a coiled spring member 124 within the housing 130 of the camera, biases the sleeve and the focusing cell therein toward one end of the focusing range. A focus adjusting mechanism, represented by pin 128 axially adjusts the sleeve to a determined focus condition.

Although a lens focusing operation occurs by axial adjustment of the sleeve, the focal length varying lens cells are not axially adjusted. Adjustments of the focal length of the lens occur upon rotation of the sleeve wherein the variator and compensator lens cells are simultaneously and differentially adjusted axially according to the cam tracks of the first barrel portion.

The material selection in this embodiment is from the same group of dimensionally stable materials as described to the preferred embodiment.

What is claimed is:

1. A lens mount assembly for a lens system including elements simultaneously and differentially axially adjustable comprising:
   a first cylindrical barrel portion having at least one axially effective cam surface;
   a second cylindrical barrel portion having at least one axially effective cam surface;
   means attaching said first barrel portion to said second barrel portion to axially relate said respective cam surfaces thereof one to the other in opposing relation;
   a third barrel portion having an axially effective cam surface disposed in axial relation to another of the cam surfaces of one of said first and second barrel portions;
   lens element carrier means having telescopically relatable guide portions, said carrier means being alignable in said barrel portions;
   cam follower means on each carrier means for rotatable and axial positioning of said carrier means relative to said barrel portions; and
   sleeve means cooperating with at least one of said cam follower means of each carrier means to drivably adjust said carrier means relative to said cam surfaces to cause simultaneous and differential axial adjustment of said lens element.

2. An assembly as in claim 1 wherein said cam surfaces are multiple cam portions, and said cam follower means includes a follower corresponding to each cam portion.

3. An assembly as in claim 1 wherein said sleeve means carries a focusing lens.

4. An assembly as in claim 1 including ledge portions on one of said barrel portions for maintaining spacing relative to the other of barrel portions.

5. An assembly as in claim 1 including biasing means connecting said sleeve means and one of said barrel portions to urge said sleeve means in a first direction relative to said barrel portion.

6. An assembly as in claim 5 including biasing means fixed to said second barrel portion for urging said sleeve means toward said first barrel portion.

7. An assembly as in claim 6 including ledge portions on said second barrel portion for maintaining spacing relative to said first barrel portion.

* * * * *